(12) United States Patent
Lee et al.

(10) Patent No.: US 8,737,481 B2
(45) Date of Patent: May 27, 2014

(54) METHOD AND APPARATUS FOR ENCODING AND DECODING IMAGE USING ADAPTIVE INTERPOLATION FILTER

(75) Inventors: Kyo-hyuk Lee, Yongin-si (KR); Bae-keun Lee, Bucheon-si (KR); Yu-mi Sohn, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1202 days.

(21) Appl. No.: 12/013,740

(22) Filed: Jan. 14, 2008

(65) Prior Publication Data

US 2008/0175322 A1    Jul. 24, 2008

Related U.S. Application Data

(60) Provisional application No. 60/885,942, filed on Jan. 22, 2007.

(30) Foreign Application Priority Data

May 11, 2007   (KR) ........................ 10-2007-0046209

(51) Int. Cl.
 *H04N 7/26*    (2006.01)
(52) U.S. Cl.
 USPC ................................................... 375/240.17
(58) Field of Classification Search
 USPC ................................................... 375/240.17
 See application file for complete search history.

(56) References Cited

U.S. PATENT DOCUMENTS

| | | | |
|---|---|---|---|
| 6,289,052 B1* | 9/2001 | Faryar et al. | 375/240.16 |
| 6,968,008 B1 | 11/2005 | Ribas-Corbera et al. | |
| 2003/0202607 A1* | 10/2003 | Srinivasan | 375/240.29 |
| 2004/0062307 A1 | 4/2004 | Hallapuro et al. | |
| 2004/0076333 A1 | 4/2004 | Zhang et al. | |
| 2005/0207496 A1* | 9/2005 | Komiya et al. | 375/240.16 |
| 2005/0243931 A1* | 11/2005 | Yasuda et al. | 375/240.16 |
| 2006/0002474 A1* | 1/2006 | Au et al. | 375/240.16 |
| 2007/0053441 A1* | 3/2007 | Wang et al. | 375/240.24 |
| 2010/0098345 A1* | 4/2010 | Andersson et al. | 382/238 |

FOREIGN PATENT DOCUMENTS

| | | |
|---|---|---|
| WO | 03/058945 A2 | 7/2003 |
| WO | 2006/033953 A1 | 3/2006 |

OTHER PUBLICATIONS

Hideaki Kimata et al., "3D Motion Vector Coding with Block Base Adaptive Interpolation Filter on H.264", NTT Cyber Space Laboratories, NTT Corporation, IEEE, Apr. 6, 2003, vol. 3, pp. III-634-III-636.

(Continued)

*Primary Examiner* — Mehrdad Dastouri
*Assistant Examiner* — Mohammed Rahaman
(74) *Attorney, Agent, or Firm* — Sughrue Mion, PLLC

(57) ABSTRACT

Provided are an image encoding method and apparatus for generating an interpolation filter using an adjacent area of a current block and a corresponding adjacent area of a reference picture and interpolating the reference picture using the generated interpolation filter, and an image decoding method and apparatus therefor. By interpolating an adjacent area of a reference picture corresponding to an adjacent area of a current block according to fractional pixel resolution of a motion vector of the current block and determining interpolation filter coefficients to minimize a difference between an interpolated adjacent area of the reference picture and the adjacent area of the current block, an interpolation filter needed for motion compensation of the current block is adaptively generated using information on the adjacent area.

16 Claims, 11 Drawing Sheets

REFERENCE PICTURE (610)

CURRENT PICTURE (600)

(56) References Cited

OTHER PUBLICATIONS

Y. Vatis et al., "Prediction of P- and B- Frames Using a Two-Dimensional Non-separable Adaptive Wiener Interpolation Filter for H.264/AVC", International Organisation for Standardisation Organisation Internationale Normalisation, ISO/IEC JTC 1/SC 29/WG 11, Coding of Moving Pictures and Audio, Mar. 22, 2006, No. M13113, 12 pages.

Communication dated Oct. 5, 2012 issued by the European Patent Office in counterpart European Patent Application No. 08704687.6.
Communication dated Nov. 26, 2013 issued by the Korean Intellectual Property Office in counterpart Korean Patent Application No. 1020070046209.
Communication dated Dec. 11, 2013 issued by the European Patent Office in counterpart European Patent Application No. 08704687.6.

* cited by examiner

FIG. 1 (RELATED ART)
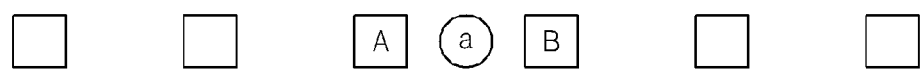
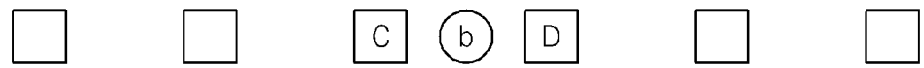
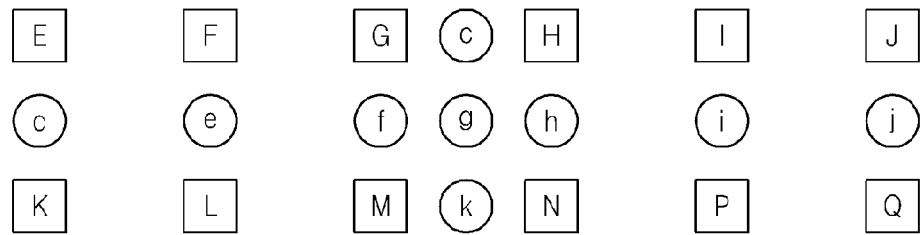
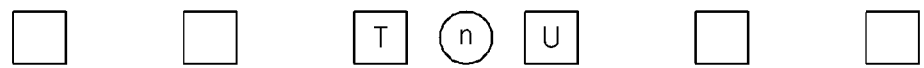
☐ : INTEGER PIXEL  ◯ : HALF PEL

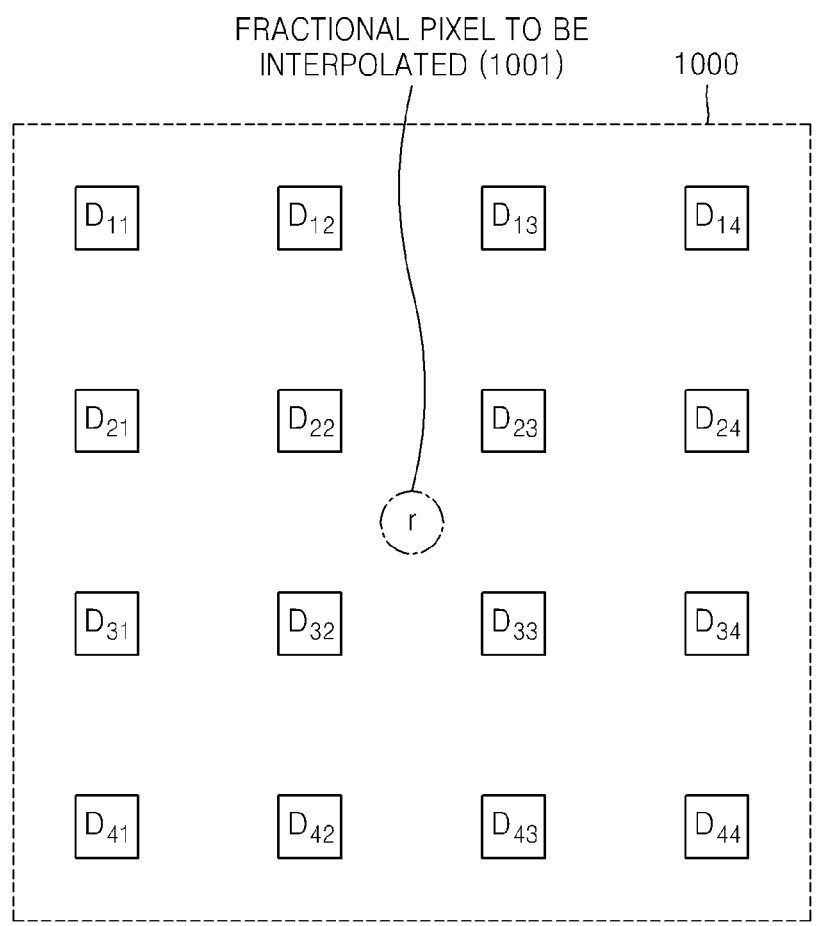

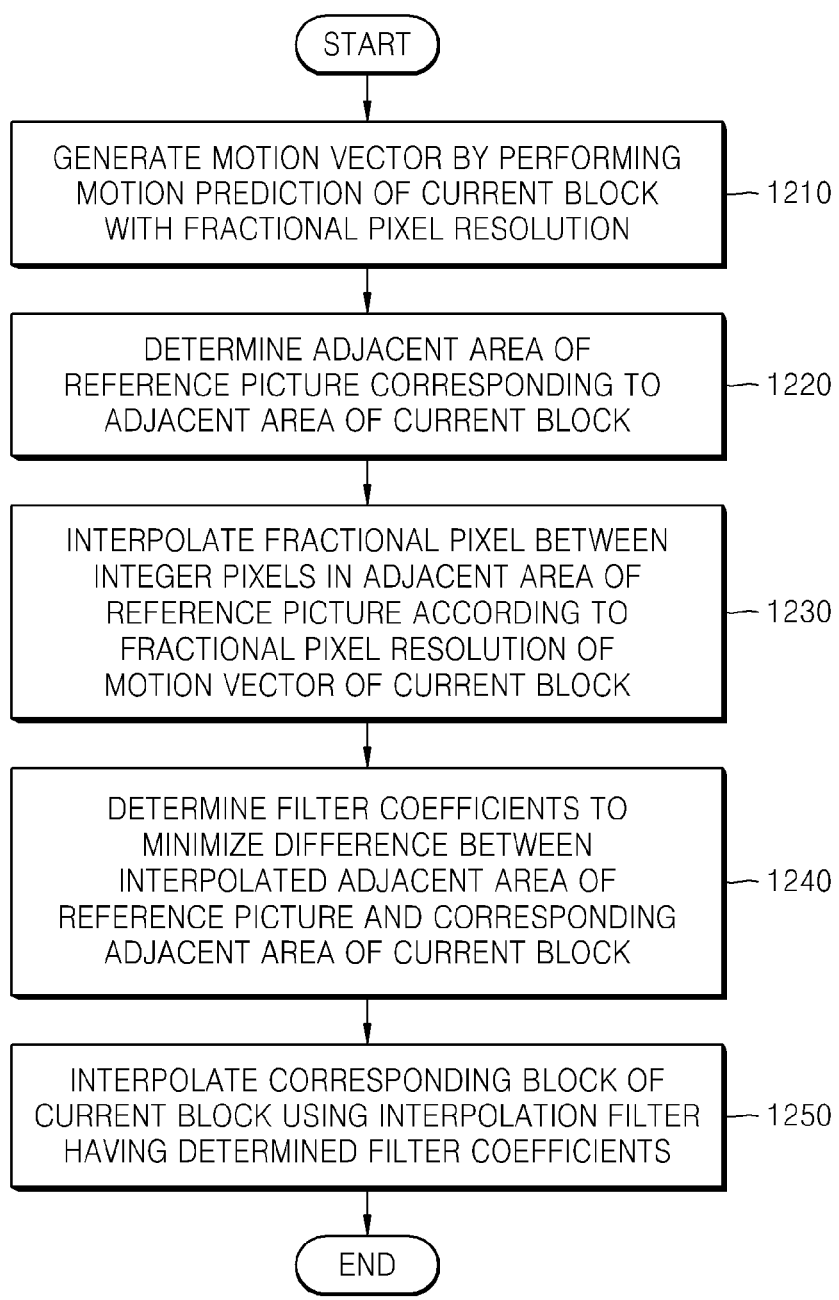

METHOD AND APPARATUS FOR ENCODING AND DECODING IMAGE USING ADAPTIVE INTERPOLATION FILTER

CROSS-REFERENCE TO RELATED PATENT APPLICATION

This application claims priority from Korean Patent Application No. 10-2007-0046209, filed on May 11, 2007 in the Korean Intellectual Property Office, and U.S. Provisional Application No. 60/885,942, filed on Jan. 22, 2007 in the U.S. patent and Trademark Office, the disclosures of which are incorporated herein in their entirety by reference.

BACKGROUND OF THE INVENTION

1. Field of the Invention

Apparatuses and method consistent with the present invention relate to an interpolation filter interpolating a reference picture for motion compensation, and more particularly, to generating an interpolation filter using an adjacent area of a current block and a corresponding adjacent area of a reference picture and interpolating the reference picture using the generated interpolation filter, and an image decoding method and apparatus therefor.

2. Description of the Related Art

In image compression methods, such as MPEG-1, MPEG-2, MPEG-4, and H.264/MPEG-4 Advanced Video Coding (AVC), in order to encode an image, a single picture is divided into macroblocks. Thereafter, each macroblock is encoded in all encoding modes available in inter prediction and intra prediction coding, and according to a bit rate required to encode a macroblock and a grade of distortion between an original macroblock and a decoded macroblock, an encoding mode is selected, and the macroblock is encoded.

Inter prediction comprises generating a motion vector by searching for an area of a reference picture similar to a block being currently encoded using at least one reference picture located before or after a picture being currently encoded and generating a prediction block of the current block by performing motion compensation using the generated motion vector.

The motion compensation is performed in a unit of fractional pixel resolution more minute than integer pixel resolution in order to increase prediction accuracy. For example, after a reference picture is interpolated by generating fractional pixels existing between integer pixels of the reference picture, such as half pels, quarter pels, and one eighth pels, motion compensation prediction is performed using the interpolated reference picture.

FIG. 1 is a diagram for explaining a reference image interpolation process according to the related art. In FIG. 1, pixels indicated using a perfect square denote integer pixels, and pixels indicated using a circle denote half pels existing between integer pixels. In addition, alphabet capital letters in square boxes denote integer pixels before interpolation is performed, and alphabet lower case letters in circles denote half pels between the integer pixels before interpolation is performed.

Referring to FIG. 1, half pels located between two integer pixels adjacent to each other in a horizontal direction are generated by applying a six-tap filter in the horizontal direction. For example, a half pel c located between integer pixels G and H in the horizontal direction is generated by applying a six-tap Finite Impulse Response (FIR) filter to six integer pixels located in the same row as the half pel c to be interpolated using an equation $c=(E-5F+20G+20H-5I+J)/32$. The weights $\{1, -5, 20, 20, -5, 1\}$ assigned to the six integer pixels adjacent to the half pel to be interpolated, which are used in the equation, are called filter coefficients.

Similarly, half pels located between two integer pixels adjacent to each other in a vertical direction are generated by applying a six-tap FIR filter in the vertical direction. For example, a half pel f located between integer pixels G and M in the vertical direction is generated by applying a six-tap FIR filter to six integer pixels located in same column as the half pel f using an equation $f=(A-CF+20G+20M-5R+T)/32$. Although it is not shown, each quarter pel is calculated by obtaining a mean value of adjacent integer pixels or half pels.

According to the related art, filter coefficients of an interpolation filter are always fixed. This is because filter coefficients applied to each block must be transmitted to a decoder for image decoding if different interpolation filters are applied to each block. However, since encoded blocks can have different image characteristics, if motion compensation prediction by applying the same interpolation filter to all blocks is performed, prediction performance may be inefficient.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Exemplary embodiments of the present invention provide image encoding methods and apparatuses for adaptively generating an interpolation filter using data of an adjacent area of a current block to be encoded and data of a corresponding adjacent area of a reference picture, and an image decoding methods and apparatuses therefor.

Exemplary embodiments of the present invention also provide image encoding and decoding methods and apparatuses for generating interpolation filter coefficients for each of a plurality of blocks without additionally transmitting the interpolation filter coefficients.

According to an aspect of the present invention, there is provided an image encoding method comprising: generating a motion vector of a current block to be encoded by performing motion prediction of the current block using fractional pixel resolution; determining an adjacent area of a reference picture corresponding to an adjacent area of the current block, the adjacent area of the current block having been encoded and decoded; generating an interpolation filter for interpolating fractional pixels between integer pixels in the adjacent area of the reference picture according to fractional pixel resolution of the motion vector of the current block, the interpolation filter interpolating the adjacent area of the reference picture to minimize a difference between an interpolated adjacent area of the reference picture and a corresponding adjacent area of the current block; and interpolating a corresponding block of the current block, which is indicated by the motion vector having the fractional pixel resolution, using the generated interpolation filter.

According to another aspect of the present invention, there is provided an image encoding apparatus comprising: a motion predictor which generates a motion vector of a current block to be encoded by performing motion prediction of the current block using fractional pixel resolution; an interpolation filter generator which generates an interpolation filter for interpolating fractional pixels between integer pixels in an adjacent area of a reference picture according to fractional pixel resolution of the motion vector of the current block using the adjacent area of the reference picture corresponding to an adjacent area of the current block, the adjacent area of the current block having been encoded and decoded, the interpolation filter interpolating the adjacent area of the reference picture to minimize a difference between an interpolated adjacent area of the reference picture and a corresponding adjacent area of the current block; and an interpolator which interpolates a corresponding block of the current block, which is indicated by the motion vector having the fractional pixel resolution, using the generated interpolation filter.

According to another aspect of the present invention, there is provided an image decoding method comprising: extracting motion vector information of a current block to be decoded from a received bitstream; if the extracted motion vector of the current block is a motion block having fractional pixel resolution, determining an adjacent area of a reference picture corresponding to an adjacent area of the current block, the adjacent area of the current block having been decoded; generating an interpolation filter for interpolating fractional pixels between integer pixels in the adjacent area of the reference picture according to the fractional pixel resolution of the motion vector of the current block, the interpolation filter interpolating the adjacent area of the reference picture to minimize a difference between an interpolated adjacent area of the reference picture and a corresponding adjacent area of the current block; and interpolating a corresponding block of the current block, which is indicated by the motion vector having the fractional pixel resolution, using the generated interpolation filter.

According to another aspect of the present invention, there is provided an image decoding apparatus comprising: a motion vector extractor which extracts motion vector information of a current block to be decoded from a received bitstream; an interpolation filter generator which generates, if the extracted motion vector of the current block is a motion block having fractional pixel resolution, an interpolation filter for interpolating fractional pixels between integer pixels in an adjacent area of a reference picture according to the fractional pixel resolution of the motion vector of the current block using the adjacent area of the reference picture corresponding to an adjacent area of the current block, the adjacent area of the current block having been decoded, the interpolation filter interpolates the adjacent area of the reference picture to minimize a difference between an interpolated adjacent area of the reference picture and a corresponding adjacent area of the current block; and an interpolator which interpolates a corresponding block of the current block, which is indicated by the motion vector having the fractional pixel resolution, using the generated interpolation filter.

BRIEF DESCRIPTION OF THE DRAWINGS

The above and other aspects of the present invention will become more apparent by describing in detail exemplary embodiments thereof with reference to the attached drawings in which:

FIG. 1 is a diagram for explaining a reference image interpolation process according to the related art;

FIG. 10 is a diagram for explaining a process of interpolating an adjacent area of a reference picture, according to another exemplary embodiment of the present invention;

FIG. 12 is a flowchart of an image encoding method according to an exemplary embodiment of the present invention;

DETAILED DESCRIPTION OF EXEMPLARY EMBODIMENTS OF THE INVENTION

The present invention will be described in detail by explaining exemplary embodiments of the invention with reference to the attached drawings.

Figure 2:
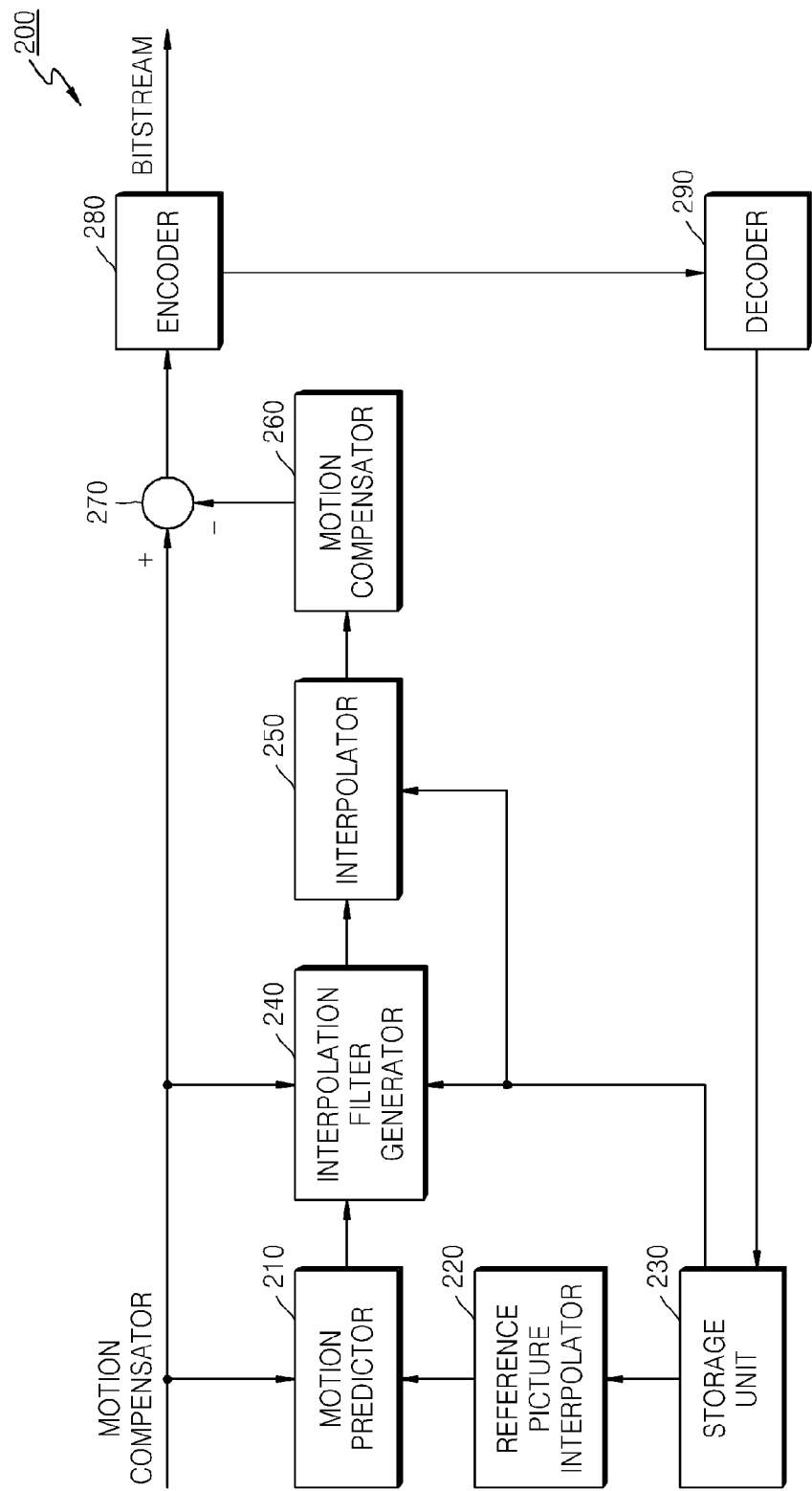
FIG. 2 is a block diagram of an image encoding apparatus according to an exemplary embodiment of the present invention.

FIG. 2 is a block diagram of an image encoding apparatus 200 according to an exemplary embodiment of the present invention.

Referring to FIG. 2, the image encoding apparatus 200 according to the current exemplary embodiment of the present invention includes a motion predictor 210, a reference picture interpolator 220, a storage unit 230, an interpolation filter generator 240, an interpolator 250, a motion compensator 260, a subtractor 270, an encoder 280, and a decoder 290.

The motion predictor 210 generates a motion vector of a current block by performing motion prediction using data of a reference picture.

Figure 3:
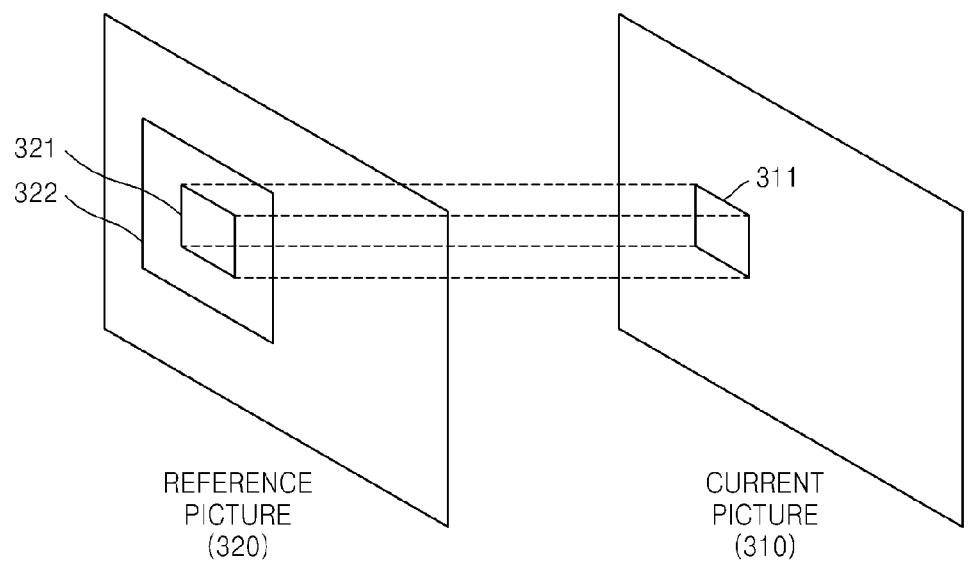
FIG. 3 is a diagram for explaining a process of performing motion prediction of a current block using the image encoding apparatus illustrated in FIG. 2, according to an exemplary embodiment of the present invention.

FIG. 3 is a diagram for explaining a process of performing motion prediction of a current block using the motion predictor 210, according to an embodiment of the present invention.

Referring to FIG. 3, the motion predictor 210 searches for a corresponding block most similar to a current block 311, which is being encoded, of a current picture 310 in a search area 322 including adjacent pixels within a predetermined range from a corresponding block 321 of a reference picture 320 located in the same spatial position as the current block 311 and generates a motion vector based on a position difference between the most similar corresponding block and the current block 311. Here, as the reference picture 320, an integer pixel unit reference picture stored in the storage unit 230 and a reference picture interpolated by the reference picture interpolator 220 using fractional pixel resolution, such as half pel resolution, quarter pel resolution, and one eighth pel resolution, are used.

Referring back to FIG. 2, the reference picture interpolator 220 interpolates a reference picture stored in the storage unit 230 using a six-tap Finite Impulse Response (FIR) filter, a two-tap mean filter, or a linear interpolation filter according to the related art. In detail, the reference picture interpolator 220 interpolates half pels using a six-tap FIR filter having filter coefficients {1, −5, 20, 20, −5, 1}, quarter pels using a two-tap mean filter obtaining a mean value of adjacent integer pixels or half pels, and one eighth pels through linear interpolation using coefficients according to lengths from adjacent integer pixels. Since the six-tap FIR filter, the two-tap mean filter, and the linear interpolation filter are related art techniques, detailed descriptions thereof will not be provided.

Figure 4:
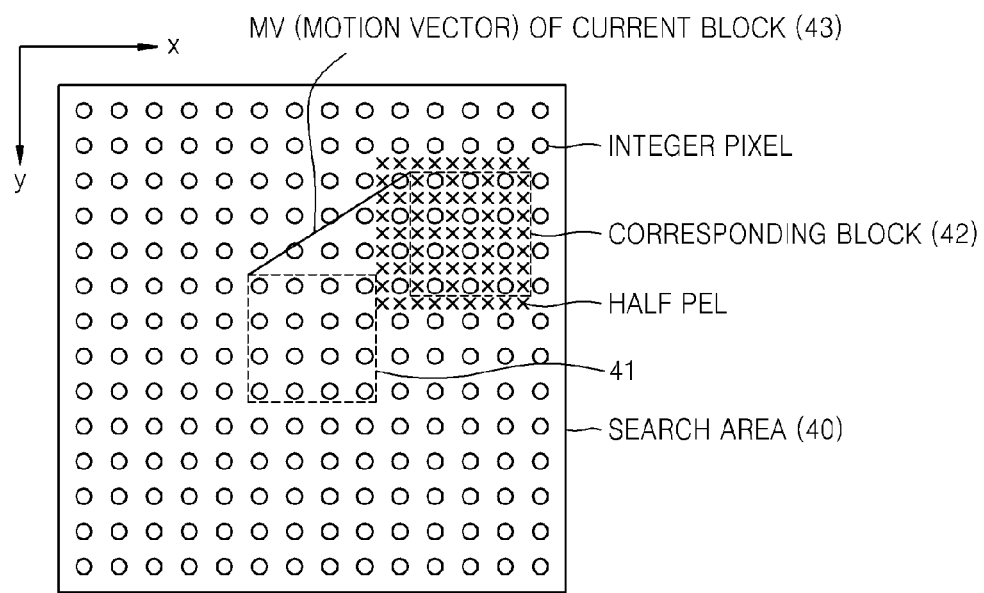
FIG. 4 is a diagram for explaining a process of performing motion prediction of a current block using fractional pixel resolution in a motion predictor of the image encoding apparatus illustrated in FIG. 2, according to an exemplary embodiment of the present invention.

FIG. 4 is a diagram for explaining a process of performing motion prediction of a current block using fractional pixel resolution in the motion predictor 210 illustrated in FIG. 2, according to an exemplary embodiment of the present invention. Referring to FIG. 4, a process of searching for a corresponding block 42 most similar to the current block in a search area 40 of a reference picture interpolated with half pel resolution is performed. In FIG. 4, a dotted block 41 denotes a block of the reference picture in the same spatial position as the current block, a circle denotes an integer pixel, and a cross denotes a half pel.

Referring to FIG. 4, if it is assumed that the corresponding block 42 most similar to the current block in the search area 40 of the reference picture interpolated with half pel resolution has been determined, the motion predictor 210 generates a motion vector 43 of the current block by calculating a spatial position difference between the block 41 of the reference picture in the same spatial position as the current block and the corresponding block 42. In FIG. 4, the motion vector 43 is (4.5, −3) based on a difference between a position of an integer pixel of an upper-left edge of the current block and a position of a half pel of an upper-left edge of the corresponding block 42. Although a motion vector having half pel resolution is illustrated in FIG. 4, the motion vector 43 of the current block can have $1/2^n$ (n is a positive integer) pixel resolution according to interpolated resolution of the reference picture.

Figure 5:
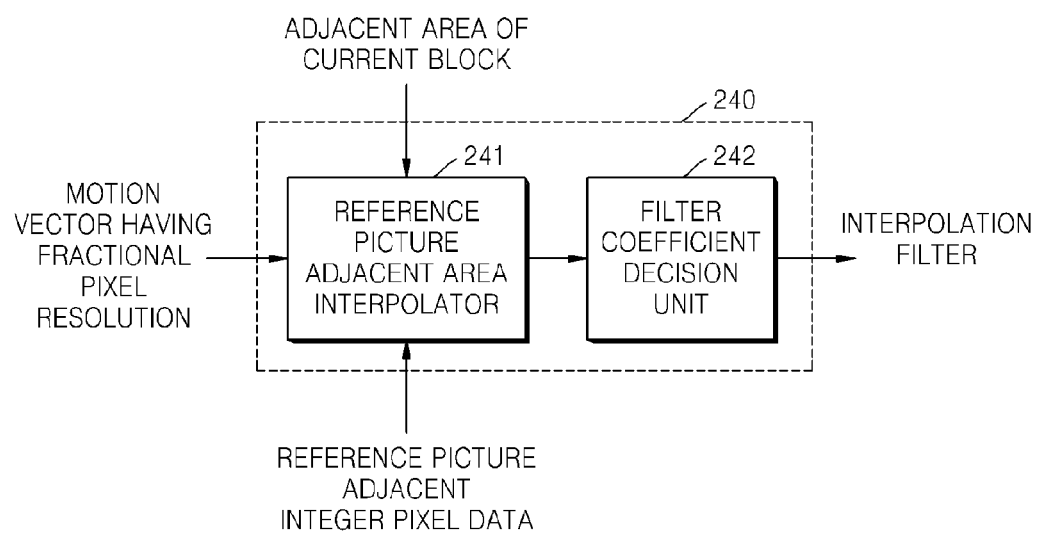
FIG. 5 is a block diagram of an interpolation filter generator of the image encoding apparatus illustrated in FIG. 2, according to an exemplary embodiment of the present invention.
Figure 6:
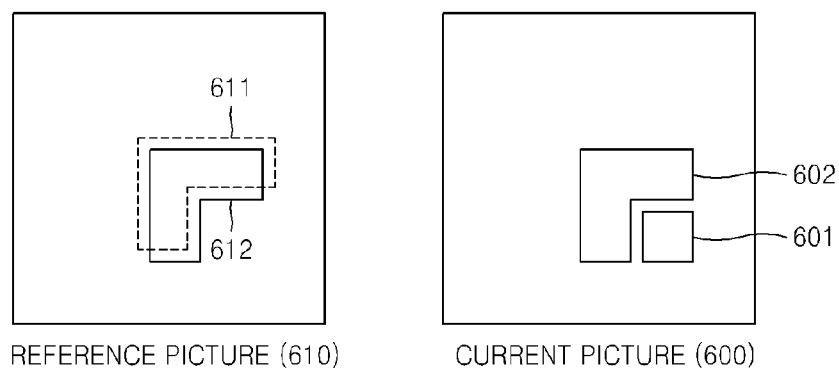
FIG. 6 illustrates an adjacent area of a current block, an adjacent area of a reference picture, and an interpolated adjacent area of the reference picture used to generate an interpolation filter in the interpolation filter generator illustrated in FIG. 2, according to an exemplary embodiment of the present invention.

FIG. 5 is a block diagram of the interpolation filter generator 240 illustrated in FIG. 2, according to an exemplary embodiment of the present invention. FIG. 6 illustrates an adjacent area 602 of a current block 601 of a current picture 600, an adjacent area 611 of a reference picture 610, and an interpolated adjacent area of the reference picture 610 used to generate an interpolation filter in the interpolation filter generator 240 illustrated in FIG. 2, according to an exemplary embodiment of the present invention.

Referring to FIGS. 5 and 6, the interpolation filter generator 240 includes a reference picture adjacent area interpolator 241 and a filter coefficient decision unit 242.

If a motion vector of the current block 601 generated by the motion predictor 210 has fractional pixel resolution, the reference picture adjacent area interpolator 241 interpolates fractional pixels between integer pixels of the adjacent area 611 of the reference picture 610 according to the fractional pixel resolution of the motion vector of the current block 601 using an adjacent area 602 of the current block 601, the adjacent area 602 having been encoded and decoded, and the adjacent area 611 of the reference picture 610 corresponding to the adjacent area 602 of the current block 601. If both a horizontal component and a vertical component of a motion vector of a current block are integers, a corresponding block of a reference picture, which is indicated by the motion vector, can be used as it is, and thus the interpolation process is omitted.

If it is assumed that each block forming the current picture 600 is encoded in the order from left to right and from top to bottom according to a raster scan order, the adjacent area 602 of the current block 601, the adjacent area 602 having been encoded and decoded, becomes a predetermined size of area including pixels located in the left and the top of the current block 601 as illustrated in FIG. 6. Here, the adjacent area 611 of the reference picture 610 can be determined using the motion vector of the current block 601 or a motion vector of the adjacent area 602 of the current block 601. That is, the corresponding adjacent area 611 can be determined from the reference picture 610 by applying the motion vector of the current block 601 to the adjacent area 602 of the current block 601 without any change, or the corresponding adjacent area 611 in the reference picture 610 can be determined using motion vectors of blocks forming the adjacent area 602 of the current block 601.

If the motion vector of the current block 601 or the motion vector of the adjacent area 602 of the current block 601 has fractional pixel resolution, a fractional pixel resolution component among a horizontal component and a vertical component of the motion vector is transformed to an integer using a round function or a trimming function, and an adjacent area 612 of the reference picture 610 can be determined using the transformed motion vector. For example, when the adjacent area 611 of the reference picture 610 corresponding to the adjacent area 602 of the current block 601 is determined using the motion vector of the current block 601, if the motion vector of the current block 601 is (−1.25, 4.75), the adjacent area 611 of the reference picture 610 can be determined by transforming the motion vector of the current block 601 to (−1, 5) and applying the transformed motion vector to the adjacent area 602 of the current block 601. This motion vector transformation process is used to omit the interpolation process for determining the adjacent area 611 of the reference picture 610.

The filter coefficient decision unit 242 calculates the sum of difference values between pixels in the interpolated adjacent area 612 of the reference picture 610 and corresponding pixels in the adjacent area 602 of the current block 601 and determines interpolation filter coefficients so that the sum of difference values is minimized. For example, when a Sum of Squared Errors (SSE) is used, the filter coefficient decision unit 242 can square difference values between pixels in the interpolated adjacent area 612 of the reference picture 610 and corresponding pixels in the adjacent area 602 of the current block 601, add the squared difference values, partially differentiate the SSE by each of interpolation filter coefficients, and determine final interpolation filter coefficients as interpolation filter coefficients such that a partially differentiated SSE is 0.

Figure 7:
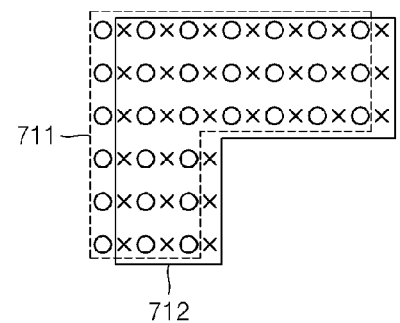
FIG. 7 illustrates an adjacent area of a reference picture and an interpolated adjacent area of the reference picture according to fractional pixel resolution of a motion vector of a current block.

FIG. 7 illustrates an adjacent area of a reference picture and an interpolated adjacent area of the reference picture according to fractional pixel resolution of a motion vector of a current block. In FIG. 7, an area indicated by reference numeral 711 denotes the adjacent area of the reference picture corresponding to an adjacent area of the current block, and an area indicated by reference numeral 712 denotes the interpolated adjacent area of the reference picture generated by interpolating half pels between integer pixels in the adjacent area 711 of the reference picture. In addition, in FIG. 7, a circle denotes an integer pixel, and a cross denotes a half pel.

If it is assumed that a motion vector of a current block has half pel resolution in the horizontal direction as (0.5, 0), in order to acquire a motion compensation value of the current block, half pels between integer pixels of a reference picture, which are adjacent to each other in the horizontal direction, must be interpolated. In this case, according to the prior art, a corresponding block of the reference picture indicated by the motion vector of the current block is interpolated using a six-tap FIR filter. Referring to FIG. 7, the reference picture adjacent area interpolator 241 according to an embodiment of the present invention interpolates half pels between integer pixels of the adjacent area 711 of the reference picture corresponding to an adjacent area of the current block, which are adjacent to each other in the horizontal direction, instead of directly interpolating the a reference picture area corresponding to the current block.

Figure 8:
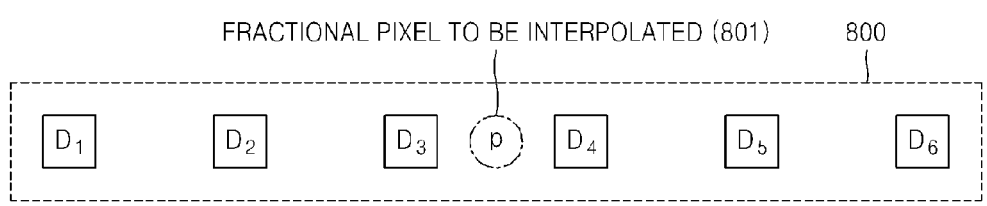
FIG. 8 is a diagram for explaining a process of interpolating an adjacent area of a reference picture, according to an exemplary embodiment of the present invention.

FIG. 8 is a diagram for explaining a process of interpolating an adjacent area of a reference picture, according to an embodiment of the present invention.

Referring to FIG. 8, if only a horizontal component of a motion vector of a current block has fractional pixel resolution as in FIG. 7, the reference picture adjacent area interpolator 241 generates an interpolation value of a fractional pixel 801 to be interpolated by defining an N×1-sized mask 800 for assigning weights to N (N is a positive integer) integer pixels adjacent to the fractional pixel 801 in the horizontal direction in an adjacent area of a reference picture, multiplying the N adjacent integer pixels in the mask 800 by the assigned weights, and adding the multiplied results.

For example, if it is assumed that N=6, six integer pixels adjacent in the horizontal direction from the fractional pixel 801 to be interpolated are D1, D2, D3, D4, D5, and D6, and weights respectively assigned to the adjacent integer pixels D1, D2, D3, D4, D5, and D6 are W1, W2, W3, W4, W5, and W6, an interpolation value p of the fractional pixel 801 is obtained using Equation 1.

$$p = W1 \cdot D1 + W2 \cdot D2 + W3 \cdot D3 + W4 \cdot D4 + W5 \cdot D5 + W6 \cdot D6 \quad \text{(Equation 1)}$$

The reference picture adjacent area interpolator 241 generates an interpolated adjacent area of the reference picture corresponding to an adjacent area of the current block by assigning predetermined weights to integer pixels in an adjacent area of a reference picture as in Equation 1, multiplying the adjacent integer pixels by the assigned weights, and adding the multiplied results.

Figure 9:
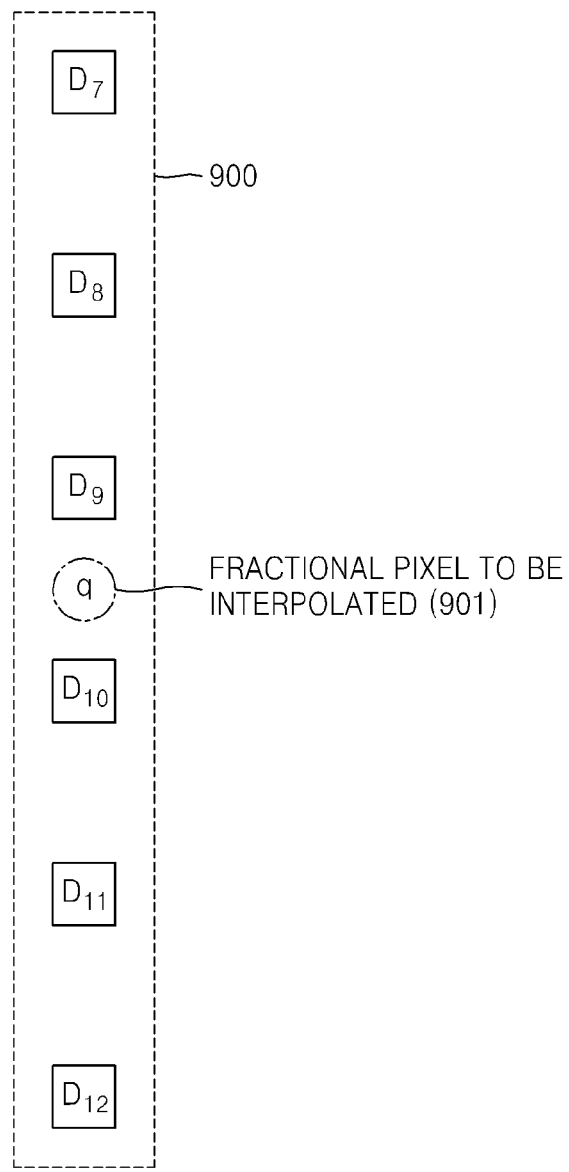
FIG. 9 is a diagram for explaining a process of interpolating an adjacent area of a reference picture, according to another exemplary embodiment of the present invention.

FIG. 9 is a diagram for explaining a process of interpolating an adjacent area of a reference picture, according to another exemplary embodiment of the present invention.

Referring to FIG. 9, if only a vertical component among horizontal and vertical components of a motion vector of a current block has fractional pixel resolution, the reference picture adjacent area interpolator 241 generates an interpolation value of a fractional pixel 901 to be interpolated by defining a 1×M-sized mask 900 for assigning weights to M (M is a positive integer) integer pixels adjacent to the fractional pixel 901 in the vertical direction in an adjacent area of a reference picture, multiplying the M adjacent integer pixels in the mask 900 by the assigned weights, and adding the multiplied results.

For example, it is assumed that the motion vector of the current block is (3, 0.5) having fractional pixel resolution in only the vertical component. In addition, if it is assumed that M=6, six integer pixels adjacent in the vertical direction from the fractional pixel 901 to be interpolated are D7, D8, D9, D10, D11, and D12, and weights respectively assigned to the adjacent integer pixels D7, D8, D9, D10, D11, and D12 are W7, W8, W9, W10, W11, and W12, an interpolation value q of the fractional pixel 901 is obtained using Equation 2.

$$q = W7 \cdot D7 + W8 \cdot D8 + W9 \cdot D9 + W10 \cdot D10 + W11 \cdot D11 + W12 \cdot D12 \quad \text{(Equation 2)}$$

FIG. 10 is a diagram for explaining a process of interpolating an adjacent area of a reference picture, according to another exemplary embodiment of the present invention.

Referring to FIG. 10, if both horizontal and vertical components of a motion vector of a current block have fractional pixel resolution, the reference picture adjacent area interpolator 241 generates an interpolation value of a fractional pixel 1001 to be interpolated by defining an N×M-sized mask 1000 for assigning weights to integer pixels adjacent to the fractional pixel 1001 in an adjacent area of a reference picture, multiplying the N×M adjacent integer pixels in the mask 1000 by the assigned weights, and adding the multiplied results.

For example, it is assumed that the motion vector of the current block is (3.5, 0.5) having fractional pixel resolution in the horizontal and vertical components. In this case, if it is assumed that the N×M-sized mask 1000 is defined on the fractional pixel 1001 to be interpolated, which exists between integer pixels in the adjacent area of the reference picture, and an adjacent integer pixel of an (i, j) position (i=1, . . . , N, j=1, . . . , M) in the defined N×M-sized mask 1000 is Dij and a weight assigned to the adjacent integer pixel Dij is Wij, an interpolation value r of the fractional pixel 1001 is obtained using Equation 3.

$$r = W11 \cdot D11 + W12 \cdot D12 + \ldots + W43 \cdot D43 + W44 \cdot D44 \quad \text{(Equation 3)}$$

A process of interpolating an adjacent area of a reference picture according to fractional pixel resolution of a motion vector of a current block is not limited to the above-described exemplary embodiments. For example, a process of interpolating an adjacent area of a reference picture using an N×M-sized mask can also be applied to a case where only any one of horizontal and vertical components of a motion vector of a current block has fractional pixel resolution. In addition, when both horizontal and vertical components of a motion vector of a current block have fractional pixel resolution, a fractional pixel between integer pixels adjacent to each other in the horizontal direction can be interpolated using an N×1-sized mask, and a fractional pixel between integer pixels adjacent to each other in the vertical direction can be interpolated using a 1×M-sized mask.

Figure 11A:
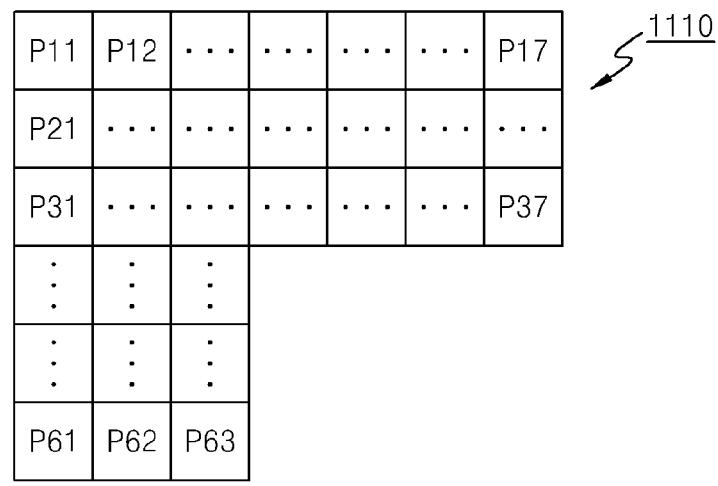
FIG. 11A illustrates an adjacent area of a current block.
Figure 11B:
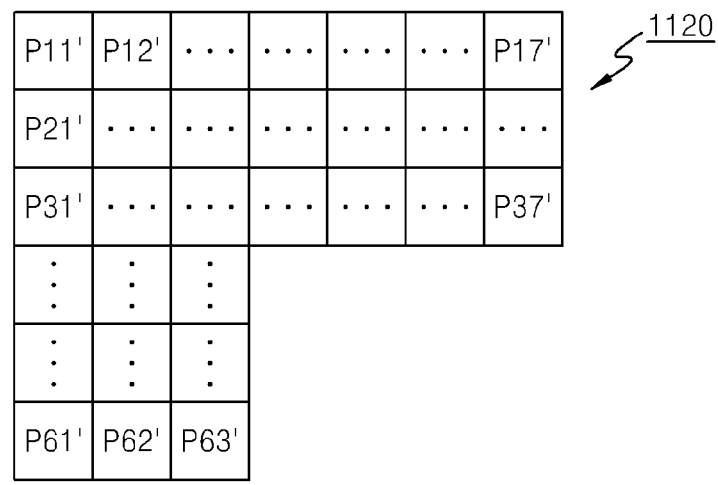
FIG. 11B illustrates an interpolated adjacent area of a reference picture generated by interpolating an adjacent area of a reference picture corresponding to the adjacent area of the current block illustrated in FIG. 11A.

FIG. 11A illustrates an adjacent area 1110 of a current block, and FIG. 11B illustrates an interpolated adjacent area 1120 of a reference picture generated by interpolating an adjacent area of a reference picture corresponding to the adjacent area 1110 of the current block illustrated in FIG. 11A. In FIGS. 11A and 11B, Pij denotes a value of a pixel of the adjacent area 1110 of the current block, which is located in (i,j), and Pij' denotes a pixel value of the interpolated adjacent area 1120 of the reference picture corresponding to the pixel located in (i,j) in the adjacent area 1110 of the current block.

Referring to FIGS. 11A and 11B, if the reference picture adjacent area interpolator 241 generates the interpolated adjacent area 1120 of the reference picture by interpolating fractional pixels between integer pixels in an adjacent area of the reference picture according to fractional pixel resolution of a motion vector of the current block, the filter coefficient decision unit 242 calculates a difference value between each pixel in the interpolated adjacent area 1120 of the reference picture and each corresponding pixel in the adjacent area 1110 of the current block, i.e. Pij−Pij', and calculates a sum E of error values between pixels in the adjacent area 1110 of the current block and corresponding interpolated fractional pixels in the adjacent area of the reference picture. As described above, if the SSE is used, the filter coefficient decision unit 242 calculates a sum of squared values of difference values between pixels corresponding to each other as in an equation E=Σ(Pij−Pij')² and determines weights of a mask by which the sum E of error values is minimized. The weights of a mask by which the sum E of error values is minimized can be determined by partially differentiating the sum E of error values by setting weights assigned to adjacent integer pixels as variables and calculating weights such that the sum E of partially differentiated error values is 0. The determined weights correspond to filter coefficients of an interpolation filter, and a block of a reference picture corresponding to that of a current block is interpolated by applying an interpolation filter having the determined filter coefficients.

A process of determining weights in an N×M-sized mask applied to interpolate an adjacent area of a reference picture is generalized as described below.

As described above, the weights in the mask must be determined to minimize a sum of error values between each pixel in an interpolated adjacent area of the reference picture and each corresponding pixel in an adjacent area of a current block.

If it is assumed that an adjacent area of a current block of a current picture, which is being encoded at a time t, is $O_{w'y'}^{t}$, an interpolated adjacent area of a reference picture corresponding to the adjacent area of the current block is $P^t(mv^t)$, a filter weight of an (i,j) position (i=1, ..., N, j=1, ..., M) in an N×M-sized mask is $W_{i,j}$, and a difference value between the adjacent area of the current block $O_{w'y'}^{t}$ and the interpolated adjacent area of the reference picture $P^t(mv^t)$ is $R_{w'y'}^{t}$, the adjacent area of the current block $O_{w'y'}^{t}$ is expressed as Equation 4 using the interpolated adjacent area of the reference picture $P^t(mv^t)$ and the difference value $R_{w'y'}^{t}$.

$$O_{w'y'}^{t} = P^t(mv^t) + R_{xy}^{t} \quad \text{(Equation 4)}$$

The interpolated adjacent area of the reference picture $P^t(mv^t)$ can be calculated through a weighted sum obtained by combining the N×M-sized mask to integer pixels in an adjacent area of a reference picture $D^{t-1}$ determined using a motion vector $m^t$ of the current block, multiplying the filter weights $W_{i,j}$ in the (i,j) position by integer pixels in an adjacent area of the reference picture, and adding the multiplied results as Equation 5. Here, the motion vector $mv^t$ can use a motion vector of the current block as a vector transformed in an integer pixel-by-integer pixel basis using a round function or a trimming function.

$$P^t(mv^t) = \sum_{i,j} W_{i,j} * D_{x+i,y+j}^{t-1}(mv^t) \quad \text{(Equation 5)}$$

As described above, the weights $W_{i,j}$ of the mask must be determined to minimize the sum of error values between an adjacent area of a current block and an interpolated adjacent area of a reference picture. If the SSE is used as the sum of error values, the SSE is calculated using Equation 6.

$$SSE = \sum_{xy} (R_{xy}^t)^2 \quad \text{(Equation 6)}$$
$$= \sum_{xy} \left( O_{xy}^t - \sum_{ij} (W_{i,j} * D_{x+i,y+j}^{t-1}(mv^t)) \right)^2$$

A weight to minimize the SSE can be determined by partially differentiating the SSE by a weight $W_{kl}$ in an arbitrary (k,l) location in the N×M-sized mask and determining weights such that the partially differentiated value is 0, as Equation 7.

$$\frac{\partial SSE}{\partial W_{kl}} = \sum_{xy} \left( 2 * \left( O_{xy}^t - \sum_{ij} W_{i,j} * D_{x+i,y+j}^{t-1}(mv^t) \right) * (-D_{x+k,y+l}^{t-1}(mv^t)) \right) \quad \text{(Equation 7)}$$
$$= -2 * \sum_{xy} (O_{xy}^t * D_{x+i,y+j}^{t-1}(mv^t))^2 +$$
$$2 * \sum_{ij} \left( W_{i,j} * \left( \sum_{xy} D_{x+i,y+j}^{t-1}(mv) * D_{x+i,y+j}^{t-1}(mv^t) \right) \right) = 0$$

Equation 7 is expressed as Equation 8 by using a predetermined operator C indicating cross correlation.

$$C_{k,l}^{O^t D^{t-1}} - \sum_{ij} \left( W_{i,j} * C_{i,j,k,l}^{D^{t-1} D^{t-1}} \right) = 0 \quad \text{(Equation 8)}$$

In Equation 8, if $G_{kl}^{O^t D^{t-1}} = C_{k,l}^{O^t D^{t-1}}$ and $G_{ij,kl}^{D^{t-1} D^{t-1}} = C_{i,j,k,l}^{D^{t-1} D^{t-1}}$, Equation 8 is expressed using Equation 9.

$$G_{kl}^{O^t D^{t-1}} - \sum_{ij} \left( W_{ij} * G_{ij,kl}^{D^{t-1} D^{t-1}} \right) = 0 \quad \text{(Equation 9)}$$

By expressing Equation 9 using a matrix expression, Equation 10 is obtained.

$$G_{1 \times MN}^{O^t D^{t-1}} - G_{MN \times MN}^{D^{t-1} D^{t-1}} * W_{1 \times MN} = 0 \quad \text{(Equation 10)}$$

By arranging Equation 10 based on a one-dimensional matrix expression $W_{1 \times MN}$ indicating a weight, Equation 11 is obtained.

$$W_{1 \times MN} = \left[ G_{MN \times MN}^{D^{t-1} D^{t-1}} \right]^{-1} \cdot G_{1 \times MN}^{O^t D^{t-1}} \quad \text{(Equation 11)}$$

That is, NM weights in the N×M-sized mask according to an exemplary embodiment of the present invention can be determined by interpolating fractional pixels between integer pixels in an adjacent area of a reference picture by using each weight as a parameter, partially differentiating a sum of squared values of difference values between an interpolated adjacent area of the reference picture and an adjacent area of a current block, and calculating weights such that the partially differentiated sum of squared values is 0.

Referring back to FIG. 2, the interpolator 250 interpolates a reference picture area corresponding to the current block using the interpolation filter generated by the interpolation filter generator 240. The motion compensator 260 generates a predicted block of the current block by acquiring a motion compensation value of the current block, which is indicted by the motion vector of the current block, from the interpolated reference picture.

The subtractor 270 calculates a residual block, which is a difference value between the predicted block and an originally input block. The encoder 280 generates a bitstream by transforming, quantizing, and entropy encoding the residual block. In addition, the encoder 280 inserts motion vector information of the current block and binary information indicating whether a corresponding block of the current block has been interpolated, into a predetermined area of the generated bitstream using the interpolation filter generated according to an exemplary embodiment of the present invention. That is, by inserting a one-bit flag, which has a value of '0' when a reference picture is interpolated according to the related art or '1' when a reference picture is interpolated by generating an interpolation filter using data of an adjacent area according to an exemplary embodiment of the present invention, into a bitstream, a decoding apparatus can determine whether an interpolation filter is generated. According to an exemplary embodiment of the present invention, by informing the decoding apparatus of only whether an interpolation filter is generated for each block, the decoding apparatus can generate an interpolation filter for interpolating a reference picture used for motion compensation of a current block through the same process as that in an encoding apparatus.

FIG. 12 is a flowchart of an image encoding method according to an exemplary embodiment of the present invention.

Referring to FIG. 12, in operation 1210, a motion vector of a current block is generated by performing motion prediction of the current block at fractional pixel resolution. As described above, the motion vector of the current block can be determined by interpolating a search area of a reference picture using a six-tap FIR filter, a two-tap mean filter, or a linear interpolation filter according to the related art and searching for a block most similar to the current block.

In operation 1220, an adjacent area of a reference picture corresponding to an adjacent area of the current block is determined. The adjacent area of the reference picture can be determined by applying the motion vector of the current block to the adjacent area of the current block or using a motion vector of the adjacent area.

In operation 1230, fractional pixels between integer pixels in the adjacent area of the reference picture are interpolated according to fractional pixel resolution of the motion vector of the current block. As described above, if only a horizontal component of components of the motion vector of the current block has fractional pixel resolution, the fractional pixels between the integer pixels in the adjacent area of the reference picture are interpolated using an N×1-sized mask or an N×M-sized mask. If only a vertical component of the components of the motion vector of the current block has fractional pixel resolution, the fractional pixels between the integer pixels in the adjacent area of the reference picture are interpolated using a 1×M-sized mask or an N×M-sized mask. If both the horizontal and vertical components of the motion vector of the current block have fractional pixel resolution, the fractional pixels between the integer pixels in the adjacent area of the reference picture are interpolated using an N×M-sized mask or can be interpolated by interpolating fractional pixels between integer pixels adjacent in the horizontal direction using an N×1-sized mask and interpolating fractional pixels between integer pixels adjacent in the vertical direction using a 1×M-sized mask.

In operation 1240, weights to minimize a difference between an interpolated adjacent area of the reference picture and a corresponding adjacent area of the current block, i.e., filter coefficients, are determined. As described above, interpolation filter coefficients for interpolating a corresponding block of the reference picture corresponding to the current block can be determined by calculating a sum of error values between each pixel in the adjacent area of the current block and each corresponding interpolated fractional pixel in the adjacent area of the reference picture using the SSE, partially differentiating the sum of error values by using each weight as a parameter, and determining weights such that the partially differentiated sum of error values is 0.

In operation 1250, a corresponding block of the current block is interpolated using an interpolation filter having the determined interpolation filter coefficients. Then, a predicted block of the current block is generated by acquiring a corresponding block of the reference block, which is indicted by the motion vector of the current block, and a bitstream is generated by transforming, quantizing, and entropy encoding a residual block, which is a difference value between the predicted block and an original pixel block. Motion vector information and predetermined binary information, which indicates whether the current block is a motion block using a reference picture interpolated using an interpolation filter generated according to an exemplary embodiment of the present invention, are inserted into a predetermined area of the generated bitstream.

Figure 13:
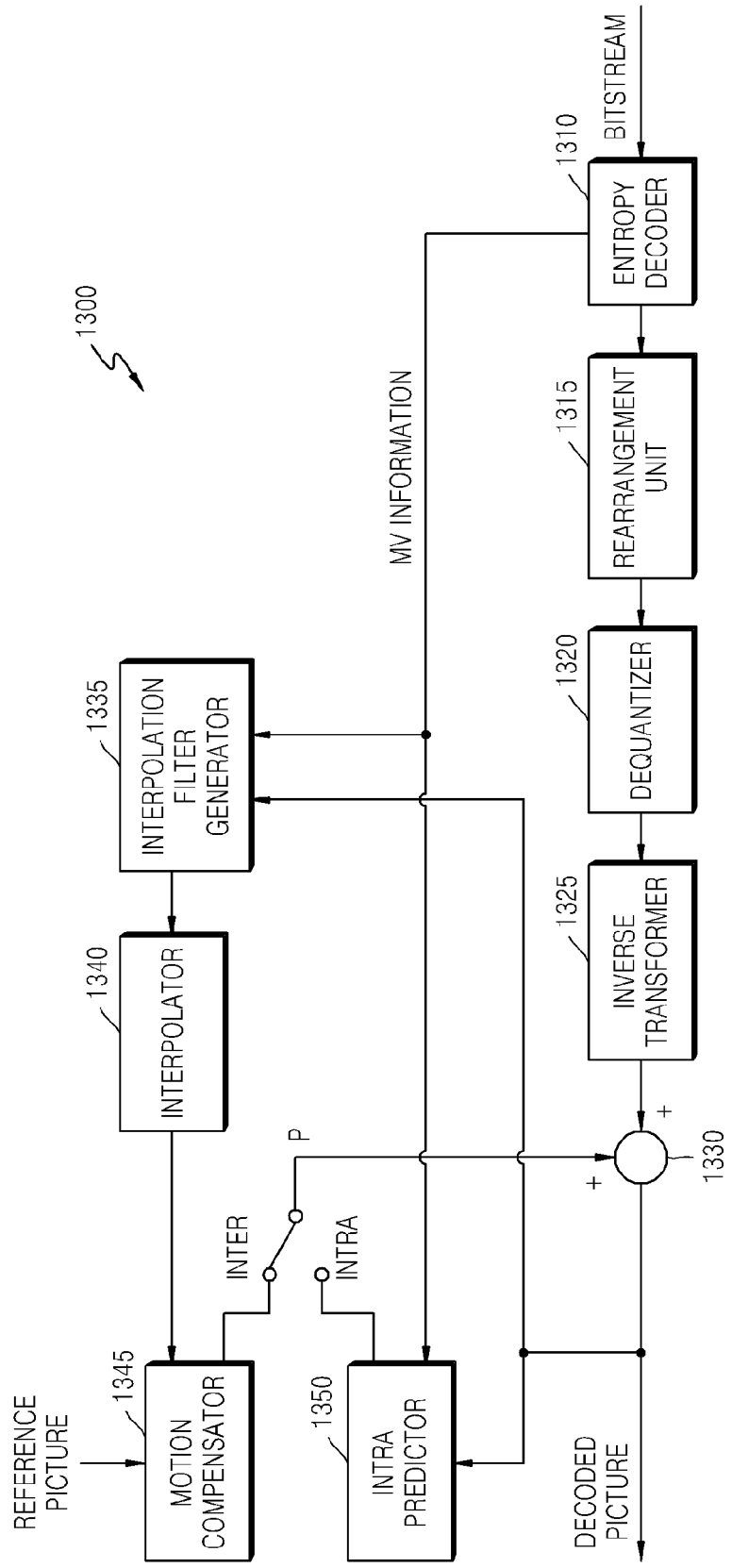
FIG. 13 is a block diagram of an image decoding apparatus according to an exemplary embodiment of the present invention.

FIG. 13 is a block diagram of an image decoding apparatus 1300 according to an exemplary embodiment of the present invention.

Referring to FIG. 13, the image decoding apparatus 1300 according to the current exemplary embodiment of the present invention includes an entropy decoder 1310, a rearrangement unit 1315, a dequantizer 1320, an inverse transformer 1325, an adder 1330, an interpolation filter generator 1335, an interpolator 1340, a motion compensator 1345, and an intra predictor 1350.

The entropy decoder 1310 receives a compressed bitstream, generates quantized coefficients by entropy decoding the compressed bitstream, and extracts motion vector information of a current block to be decoded and binary information indicating whether an adaptive interpolation filter according to an exemplary embodiment of the present invention has been applied. The rearrangement unit 1315 rearranges the quantized coefficients, and the dequantizer 1320 and the inverse transformer 1325 restore a residual by dequantizing and inverse transforming the quantized coefficients, respectively.

If the extracted motion vector of the current block is a motion block having fractional pixel resolution, the interpolation filter generator 1335 generates an interpolation filter for interpolating fractional pixels between integer pixels in an adjacent area of a reference picture according to the fractional pixel resolution of the motion vector of the current block using the adjacent area of the reference picture corresponding to an adjacent area of the current block, which has been decoded, the interpolation filter interpolating the adjacent area of the reference picture to minimize a difference between an interpolated adjacent area of the reference picture and a corresponding adjacent area of the current block. Since a configuration and operation of the interpolation filter generator 1335 illustrated in FIG. 13 are the same as those of the interpolation filter generator 240 illustrated in FIG. 2, detailed descriptions thereof are not provided.

The interpolator 1340 interpolates a reference picture area corresponding to the current block using the interpolation filter generated by the interpolation filter generator 1335.

The motion compensator 1345 acquires a motion compensation value of the current block from the interpolated reference picture, and the adder 1330 decodes the current block by adding the motion compensation value of the current block and the restored residual.

Figure 14:
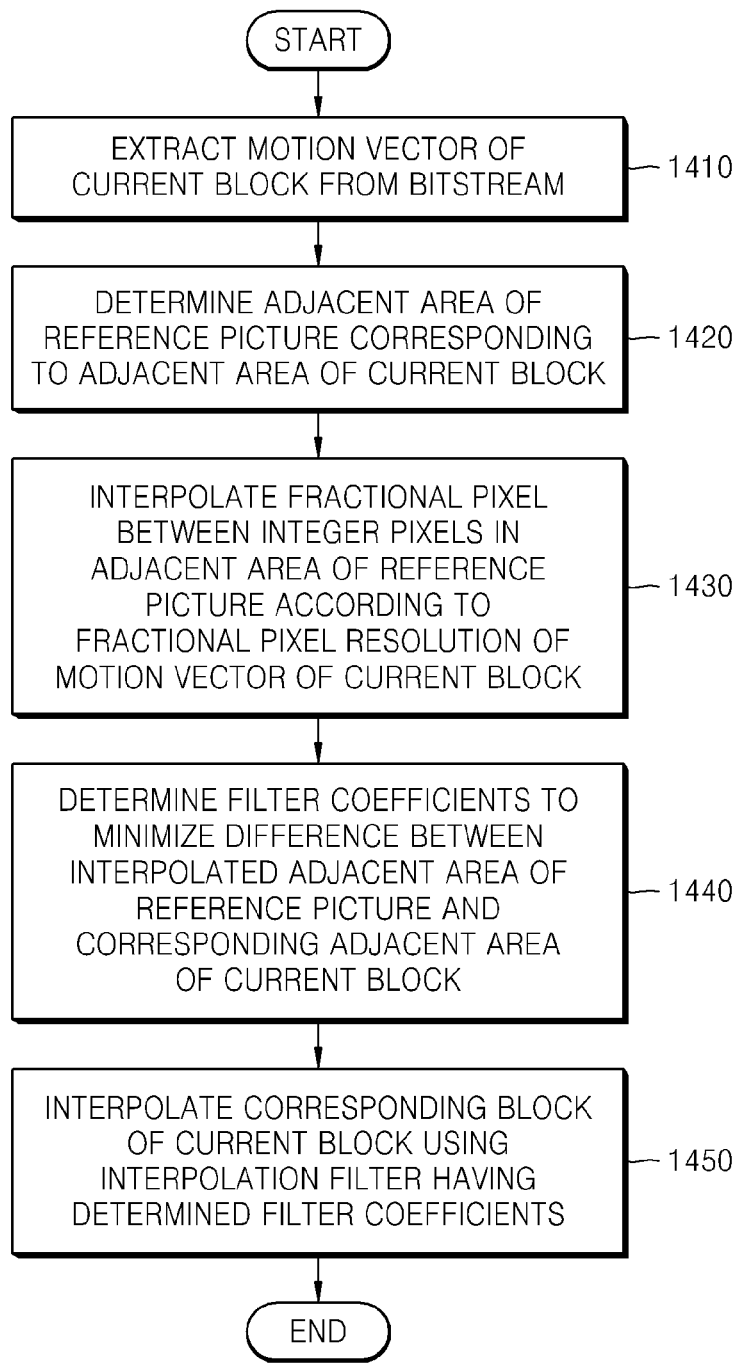
FIG. 14 is a flowchart of an image decoding method according to an exemplary embodiment of the present invention.

FIG. 14 is a flowchart of an image decoding method according to an embodiment of the present invention.

Referring to FIG. 14, in operation 1410, a motion vector of a current block is extracted from a received bitstream.

In operation 1420, if the extracted motion vector has fractional pixel resolution, an adjacent area of a reference picture corresponding to an adjacent area of the current block, which has been decoded, is determined. The adjacent area of the reference picture can be determined by applying the motion vector of the current block to the adjacent area of the current block or using a motion vector of the adjacent area.

In operation 1430, fractional pixels between integer pixels in the adjacent area of the reference picture are interpolated according to the fractional pixel resolution of the motion vector of the current block. As described above, the fractional pixels are interpolated by combining a predetermined-sized mask for assigning weights to integer pixels adjacent to each fractional pixel to be interpolated, which exists between integer pixels in the adjacent area of the reference picture and calculating a weighted sum obtained by multiplying the adjacent integer pixels in the mask and the assigned weights and adding the multiplied results. In this case, the interpolated fractional pixels are expressed in the form of a function using weights as a parameter.

In operation 1440, weights to minimize a difference between an interpolated adjacent area of the reference picture and a corresponding adjacent area of the current block, i.e. filter coefficients, are determined. For example, interpolation filter coefficients can be determined by calculating a sum of error values between each pixel in the adjacent area of the current block and each interpolated fractional pixel in the adjacent area of the reference picture using the SSE, partially differentiating the sum of error values by using each weight as a parameter, and determining weights such that the partially differentiated sum of error values is 0.

In operation 1450, a corresponding block of the current block is interpolated using an interpolation filter having the determined interpolation filter coefficients. Then, a motion compensation value of the current block is acquired using the interpolated reference picture, and the current block is decoded by adding the motion compensation value and a residual.

The interpolation filter according to an exemplary embodiment of the present invention can be adaptively used together with an interpolation filter according to the prior art. That is, by comparing a rate-distortion cost of a bitstream generated using a reference picture interpolated according to the prior art and a rate-distortion cost of a bitstream generated using a reference picture interpolated according to an embodiment of the present invention, an encoding apparatus can determine a relatively low-cost interpolation filter used to generate a bitstream as a finally applied interpolation filter. In addition, the interpolation filter according to an embodiment of the present invention may replace the entire conventional interpolation filter or only a portion of a conventional interpolation filter, and can be used by being added to a conventional interpolation filter.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks and optical data storage devices.

As described above, according to the exemplary embodiments of the present invention, by generating an interpolation filter for each of a plurality of blocks and performing motion prediction compensation, a difference between a motion compensation value and original image data can be reduced, resulting in a decrease of the size of residual data and an increase of image compression efficiency.

In addition, even without transmitting all interpolation filter coefficients, interpolation filter coefficients can be adaptively determined using previously encoded data of an adjacent area.

While this invention has been particularly shown and described with reference to exemplary embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An image encoding method comprising:
   generating a motion vector of a current block to be encoded by performing motion prediction of the current block, the motion vector having fractional pixel resolution;
   determining an adjacent area of a reference picture corresponding to an adjacent area of the current block, the adjacent area of the current block having been encoded and decoded prior to the current block;
   generating an interpolation filter for interpolating fractional pixels between integer pixels in the adjacent area of the reference picture according to fractional pixel resolution of the motion vector of the current block, the interpolation filter interpolating the adjacent area of the reference picture to minimize a difference between the interpolated adjacent area of the reference picture and a corresponding adjacent area of the current block; and
   interpolating a corresponding block of the current block, which is indicated by the motion vector having the fractional pixel resolution, using the generated interpolation filter,
   wherein the generating the interpolation filter comprises:
   interpolating the fractional pixel to be interpolated between integer pixels in the adjacent area of the reference picture by combining a mask for assigning weights to the adjacent integer pixels based in the fractional pixel and calculating a weighted sum obtained by multiplying the adjacent integer pixels in the mask by the assigned weights and adding the multiplied results;

calculating a sum of error values between pixels in the adjacent area of the current block and corresponding interpolated fractional pixels in the adjacent area of the reference picture; and determining weights of the mask to minimize the sum of error values, wherein the determining the weights of the masks comprises determining the weights of the mask by partially differentiating the sum of error values using the weights assigned to the adjacent integer pixels as variable and calculating weights such that the partially differentiated sum of error values is 0.

2. The image encoding method of claim 1, wherein the generating the motion vector of the current block comprises:

interpolating a search area of the reference picture to a fractional pixel resolution using at least one of a six-tap Finite Impulse Response (FIR) filter, a two-tap mean filter, and a linear interpolation filter;

determining a position of a corresponding block most similar to the current block in the interpolated search area of the reference picture; and calculating the motion vector of the current block based on a difference between a position of the current block and the position of the corresponding block of the reference picture.

3. The image encoding method of claim 1, wherein the adjacent area of the reference picture corresponding to the adjacent area of the current block is determined using the motion vector of the current block or a motion vector of the adjacent area of the current block.

4. The image encoding method of claim 3, further comprising:

if the selected motion vector has fractional pixel resolution, transforming a component value having fractional pixel resolution among horizontal and vertical components of the selected motion vector to an integer value using a round function or a trimming function.

5. The image coding method of claim 1, wherein the sum of error values uses a sum of squared error obtained by multiplying difference values between each pixel in the adjacent area of the current block and each corresponding interpolated fractional pixel in the adjacent area of the reference picture and adding a result of the multiplying the difference values.

6. The image encoding method of claim 1, further comprising:

generating a bitstream by at least one of transforming, quantizing, and entropy encoding a difference value between an interpolated corresponding block of the current block and an originally input block; and inserting motion vector information of the current block and binary information, which indicates that the corresponding block of the current block has been interpolated using an interpolation filter used to interpolate the adjacent block of the reference picture, into an area of the generated bitstream.

7. The image encoding method of claim 1, wherein the interpolation filter is generated with respect to the adjacent area of the reference picture and the corresponding adjacent area of the current block.

8. The image encoding method of claim 1, wherein the interpolation filter is generated based on the adjacent area of the reference picture and the corresponding adjacent area of the current block.

9. An image encoding apparatus comprising:

a motion predictor which generates a motion vector of a current block to be encoded by performing motion prediction of the current block, the motion vector having fractional pixel resolution;

an interpolation filter generator which generates an interpolation filter for interpolating fractional pixels between integer pixels in an adjacent area of a reference picture according to fractional pixel resolution of the motion vector of the current block using the adjacent area of the reference picture corresponding to an adjacent area of the current block, the adjacent area of the current block having been encoded and decoded prior to the current block, the interpolation filter interpolating the adjacent area of the reference picture to minimize a difference between an interpolated adjacent area of the reference picture and a corresponding adjacent area of the current block; and an interpolator which interpolates a corresponding block of the current block, which is indicated by the motion vector having the fractional pixel resolution, using the generated interpolation filter, wherein the interpolation filter generator further comprises:

a reference picture adjacent area interpolator which interpolates a fractional pixel to be interpolated between integer pixels in the adjacent area of the reference picture by combining a mask for assigning weights to the adjacent integer pixels based on the fractional pixel and calculating a weighted sum obtained by multiplying the adjacent integer pixels in the mask by the assigned weights and adding the multiplied results; and a filter coefficient decision unit which calculates a sum of error values between pixels in the adjacent area of the current block and corresponding interpolated fractional pixels in the adjacent area of the reference picture, and determines weights of the mask to minimize the sum of error values, wherein the filter coefficient decision unit partially differentiates the sum of error values using the weights assigned to the adjacent integer pixels as variables and determines weights as filter coefficients, such that the partially differentiated sum of error values us 0.

10. The image encoding apparatus of claim 9, further comprising a reference picture interpolator which interpolates a search area of the reference picture to the fractional picture to the fractional pixel resolution using at least one of a six-tap Finite Impulse Response (FIR) filter, a two-tap mean filter, and a linear interpolation filter, wherein the motion predictor determines a position of a corresponding block most similar to the current block in the interpolated search area of the reference picture and calculates the motion vector of the current block and the position of the corresponding block of the reference picture.

11. The image encoding apparatus of claim 9, wherein the adjacent area of the reference picture corresponding to the adjacent area of the current block is determined using the motion vector of the current block or a motion vector of the adjacent area of the current block.

12. An image decoding method comprising:

extracting motion vector information of a current block to be decoded from a received bitstream;

if the extracted motion vector of the current block is a motion block having fractional pixel resolution, determining an adjacent area of a reference picture corresponding to an adjacent area of the current block, the adjacent area of the current block having been decoded prior to the current block;

generating an interpolation filter for interpolating fractional pixels between integer pixels in the adjacent area of the reference picture according to the fractional pixel resolution of the motion vector of the current block, the interpolation filter interpolating the adjacent area of the reference picture to minimize a difference between the interpolated adjacent area of the reference picture and a corresponding adjacent area of the current block; and interpolating a corresponding block of the current block, which is indicated by the motion vector having the fractional pixel resolution, using the generated interpolation filter, wherein the generating the interpolation filter comprises:

interpolating the fractional pixel to be interpolated between integer pixels in the adjacent area of the reference picture by combining a mask for assigning weights to the adjacent integer pixels based on the fractional pixel and calculating a weighted sum obtained by multiplying the adjacent integer pixels in the mask by the assigned weights and adding the multiplied results;

calculating a sum of error values between pixels in the adjacent area of the current block and corresponding interpolated fractional pixels in the adjacent area of the reference picture; and determining weights of the mask to minimize the sum of error values, wherein the determining the weights of the mask comprises determining the weights of the mask by partially differentiating the sum of error values using the weights assigned to the adjacent integer pixels as variables and calculating weights such that the partially differentiated sum of error values is 0.

13. The image decoding method of claim 12, wherein the determining the adjacent area of the reference picture corresponding to the adjacent area of the current block is performed using the motion vector of the current block or a motion vector of the adjacent area of the current block.

14. The image decoding method of claim 13, further comprising:

if the selected motion vector has fractional pixel resolution, transforming a component value having fractional pixel resolution among horizontal and vertical components of the selected motion vector to an integer value using a round function or a trimming function.

15. The image decoding method of claim 12, wherein the sum of error values uses a sum of squared error obtaining by multiple difference values between each pixel in the adjacent area of the current block and each corresponding interpolated fractional pixel in the adjacent area of the reference picture and adding a result of the multiplying the difference values.

16. An image decoding apparatus comprising:

a motion vector extractor which extracts motion vector information of a current block to be decoded from a received bitstream;

an interpolation filter generator which generates, if the extracted motion vector of the current block is a motion block having fractional pixel resolution, an interpolation filter for interpolating fractional pixels between integer pixels in an adjacent area of a reference picture according to the fractional pixel resolution of the motion vector of the current block using the adjacent area of the reference picture corresponding to an adjacent area of the current block, the adjacent area of the current block having been decoded prior to the current block, the interpolation filter interpolating the adjacent area of the reference picture to minimize a difference between an interpolated adjacent area of the reference picture and a corresponding adjacent area of the current block; and an interpolator which interpolates a corresponding block of the current block, which is indicated by the motion vector having the fractional pixel resolution, using the generated interpolation filter, wherein the interpolation filter generator further comprises:

a reference picture adjacent area interpolator which interpolates the fractional pixel to be interpolated between integer pixels in the adjacent area of the reference picture by combining a mask for assigning weights to the adjacent integer pixels based on the fractional pixel and calculating a weighted sum obtained by multiplying the adjacent integer pixels in the mask by the assigned weights and adding the multiplied results; and a filter coefficient decision unit which calculates a sum of error values between pixels in the adjacent area of the current block and corresponding interpolated fractional pixels in the adjacent area of the reference picture and determining weights of the mask to minimize the sum of error values, wherein the filter coefficient decision unit partially differentiates the sum of error values using the weights assigned to the adjacent integer pixels as variables and determines weights as filter coefficients, such that the partially differentiated sum of error value is 0.

* * * * *